United States Patent
Ben Yehezkel et al.

(10) Patent No.: US 11,902,207 B2
(45) Date of Patent: Feb. 13, 2024

(54) TCP POWER OPTIMIZATION PROTOCOL FOR CONNECTED AND LOW THROUGHPUT DEVICES

(71) Applicant: TEXAS INSTRUMENTS INCORPORATED, Dallas, TX (US)

(72) Inventors: Yoav Ben Yehezkel, Netanya (IL); Yaron Alpert, Hod Hasharon (IL)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

(21) Appl. No.: 17/515,304

(22) Filed: Oct. 29, 2021

(65) Prior Publication Data

US 2022/0173868 A1  Jun. 2, 2022

Related U.S. Application Data

(60) Provisional application No. 63/119,744, filed on Dec. 1, 2020.

(51) Int. Cl.
| | |
|---|---|
| *H04L 5/00* | (2006.01) |
| *H04L 1/00* | (2006.01) |
| *H04L 43/0864* | (2022.01) |
| *H04L 69/16* | (2022.01) |
| *H04W 80/06* | (2009.01) |

(52) U.S. Cl.
CPC .......... *H04L 5/0053* (2013.01); *H04L 1/0007* (2013.01); *H04L 43/0864* (2013.01); *H04L 69/161* (2013.01); *H04W 80/06* (2013.01)

(58) Field of Classification Search
CPC . H04L 5/0053; H04L 1/0007; H04L 43/0864; H04L 69/161; H04L 1/18; H04L 67/12; H04W 80/06; Y02D 30/70
See application file for complete search history.

(56) References Cited

U.S. PATENT DOCUMENTS

| | | | |
|---|---|---|---|
| 2005/0080842 | A1 | 4/2005 | Takeuchi et al. |
| 2013/0286835 | A1 | 10/2013 | Plamondon et al. |
| 2014/0269269 | A1* | 9/2014 | Kovvali ............... H04W 24/04 370/252 |
| 2017/0142016 | A1* | 5/2017 | Shichino ............... H04L 67/10 |
| 2017/0169640 | A1 | 6/2017 | Britt |
| 2018/0092115 | A1* | 3/2018 | Krasnyanskiy ........ H04L 1/1854 |
| 2018/0227332 | A1* | 8/2018 | Neystadt ............ H04L 65/1053 |
| 2019/0313335 | A1* | 10/2019 | Kwon .................. H04W 76/20 |
| 2020/0266955 | A1* | 8/2020 | Agrawal ................ H04L 69/16 |
| 2021/0250982 | A1* | 8/2021 | Sun ....................... H04L 5/0053 |
| 2021/0385825 | A1* | 12/2021 | Meylan ................ H04W 80/02 |

\* cited by examiner

*Primary Examiner* — Charles C Jiang
*Assistant Examiner* — Shawn D Miller
(74) *Attorney, Agent, or Firm* — Mandy Barsilai Fernandez; Frank D. Cimino (57) ABSTRACT

A method includes determining to send a data packet from a first transceiver to a second transceiver, the data packet configured according to a TCP, determining, at the first transceiver, to trigger the second transceiver to send an ACK packet according to a delayed ACK protocol, sending, from the first transceiver, the data packet with an additional packet responsive to determining the triggering of the ACK packet, and receiving, at the first transceiver, the ACK packet from the second transceiver responsive to the additional packet.

23 Claims, 3 Drawing Sheets

TCP POWER OPTIMIZATION PROTOCOL FOR CONNECTED AND LOW THROUGHPUT DEVICES

CROSS-REFERENCE TO RELATED APPLICATIONS

The present application claims priority to U.S. Provisional Patent Application No. 63/119,744, which was filed Dec. 1, 2020 and is hereby incorporated herein by reference in its entirety.

BACKGROUND

The transmission control protocol (TCP) is a packet switching based protocol in present data communication networks, such as over the Internet. For example, TCP is useful to transmit data in the form of packets, at an intermediate level between an application program and the Internet Protocol. A TCP connection can be established, such as over a communication network, between two communicating nodes to transmit packets between the two nodes. The program applications responsible for sending and receiving the packets on the nodes may not be aware of, or involved in, the mechanisms for sending the packets via the connection. Sending the packets is handled by a TCP communication layer, also referred to as Layer 3/Layer 4 (L3/4). The TCP mechanisms for handling packet transmission include acknowledgment-based protocols that confirm, by the receiving node to the sending node, the reception of the packets. The reception of the packets is confirmed by the receiving node sending an acknowledgement (ACK) packet configured to indicate to the sending node that the packets were received by the receiving node.

SUMMARY

In accordance with at least one example of the description, a method includes determining to send a data packet from a first transceiver to a second transceiver, the data packet configured according to a TCP, determining, at the first transceiver, to trigger the second transceiver to send an ACK packet according to a delayed ACK protocol, sending, from the first transceiver, the data packet with an additional packet responsive to determining the triggering of the ACK packet, and receiving, at the first transceiver, the ACK packet from the second transceiver responsive to the additional packet.

In accordance with another example of the description, a method includes determining, by a first transceiver, whether a second transceiver is configured for sending an ACK packet according to a delayed ACK protocol, sending, by the first transceiver, data packets to the second transceiver in a transmission burst including a last packet for triggering the second transceiver to send the ACK packet immediately, wherein the transmission burst includes an even number of packets including the data packets and the last packet, receiving the ACK packet from the second transceiver, and responsive to receiving the ACK packet, setting a power mode of the first transceiver via Layer 2 signaling.

In accordance with another example of the description, an apparatus includes a memory configured to store instructions and a processor coupled to the memory, wherein the instructions cause the processor to be configured to send a data packet in a transmission burst of packets to a transceiver, the data packet is configured according to a TCP, determine to trigger the transceiver to send an ACK packet according to a delayed ACK protocol, send a dummy packet or a duplicate of the data packet in the transmission burst of packets, and receive the ACK packet from the transceiver before a timing out of the transceiver according to the delayed ACK protocol.

BRIEF DESCRIPTION OF THE DRAWINGS

For a detailed description of various examples, reference will now be made to the accompanying drawings in which.

DETAILED DESCRIPTION

In TCP acknowledgment-based protocols, an ACK packet is sent by a receiving node after receiving one or more packets from a sending node. For example, the receiving and sending nodes may be network devices, such as computer or mobile devices, that establish a closed loop two-way connection for exchanging data in the format of TCP packets. A packet that carries data is referred to as a data packet. To reduce data packet overhead and increase bandwidth utilization, the data packets can be exchanged according to a delayed ACK protocol, where multiple data packets are sent by the sending node before receiving an ACK packet from the receiving node for the data packets. The receiving node may aggregate the multiple data packets by a single ACK packet response. The receiving node may wait for receiving an even number of data packets, according to ACK sending criteria, before aggregating the acknowledgement by a single ACK response to the sending node. The sending node may store the data packets until receiving the ACK packet or may retransmit the data packets after a preset time without receiving an ACK packet. The data packets may be sent over transmission bursts of packets separated by relatively longer time transmission free intervals. For example, the receiving node may wait to receive more than one data packet, according to a configuration, from the sending node before sending an ACK packet to the sending node. The ACK packet indicates to the sending node that the even number of data packets was received by the receiving node.

In other embodiments, the receiving node may be triggered to send the ACK packet to the sending node in response to receiving an odd number of data packets, or any type of packets. In further embodiments, the receiving node may be configured to aggregate the acknowledgement by a single ACK response to the sending node responsive to receiving a certain predetermined number of data packets or any type of packets. For example, the receiving node may be configured to send an ACK packet to the sending node if a certain expected number of data packets, or any type of packets according to the ACK sending criteria, is received from the sending node. The predetermined number of packets for triggering the ACK packet response from the receiving node may be an even number or odd number of packets. For example, the receiving node may be programmed to send the ACK packet to the sending node in response to receiving three or, in another configuration, four packets from the sending node.

The sending node may retain in a memory of the sending node, the data of the data packets sent to the receiving node, until receiving an ACK packet from the receiving node. The sending node may remove the data from the memory after receiving the ACK packet, or may resend the data to the receiving node after a time has passed without receiving an ACK packet from the receiving node. According to the delayed ACK protocol, the receiving node may also send an ACK packet to the sending node if a certain predetermine ACK wait time has passed after receiving a last packet from the sending node, regardless of the number of packets previously received from the sending node. During this delayed ACK wait time, the sending node is not sending data packets but maintains in the memory the data that was sent to the receiving node.

After receiving the ACK packet, the sending node may enter a transmission free interval or idle state and switch to a lower power mode or shut down at least some of its functions. However, while maintaining the data in the memory, the sending node may be in a standby power mode that consumes an amount of power. Low throughput devices may send one or more data packets in transmission bursts and enter an idle state over longer time transmission-free intervals. During the idle state, the low throughput devices may switch to a power saving mode, such as a sleep mode to preserve power. For example, low throughput devices, such as Internet of things (IoT) devices, may transmit one or more data packets in transmission bursts separated by relatively longer time transmission free intervals. Accordingly, the majority of power consumed may be during the transmission bursts. Examples of IoT devices include smartphones or other mobile devices, smartwatches, smart fire alarms, smart door locks, sensor devices, fitness trackers, or smart security systems. Some IoT devices may be powered by a battery and communicate with other devices via a TCP connection. For such devices, power saving during transmission free intervals may preserve battery lifetime.

This description includes various examples of implementing an ACK protocol to reduce the wait time for receiving an ACK packet at the sending node, which is also referred as the ACK response time. The ACK response time for the sending node may be reduced by reducing the delayed ACK wait time at the receiving node. The sending node may trigger the receiving node to send an ACK packet rather than waiting for the receiving node to time out after receiving an odd number of data packets from the sending node. The sending node may send a dummy packet to the receiving node, causing the receiving node to send an ACK packet. The dummy packet may be sent after sending the odd number of data packets or in any order with the sent data packets to reach an expected even number of received packets by the receiving node. The receiving node which may be configured to send an ACK response after receiving the expected even number of packets is triggered by the combined even number of received dummy packet and data packets to send the ACK packet to the sending node. For example, the dummy packet may be a packet empty of data, or may include an indication of its status as a dummy packet, to the sending node. According to TCP, the receiver node may send an ACK packet after receiving an even number of full sized packets. The full sized packets may be set according to a maximum segment size (MSS) option which determines the largest segment sized packet for the receiving node. The MSS option may be modified to allow shorter segment sized packet to trigger the receiving node to send the ACK packet, after having received an even number of packets. The delayed ACK wait time at the receiving node may also be reduced by sending, from the sending node to the receiving node, an additional duplicate data packet with an odd number of data packets, or by splitting a data packet into multiple data packets to reach an even number of data packets. The duplicate packet or the split packets may be sent after sending the odd number of data packets or in any order with the data packets. To enable the sending node to reduce the ACK response time, the sending node may be configured to monitor the delayed ACK wait time or the number of data packets being sent. The process of determining and triggering the ACK packet from the receiving node may be performed by the sending node end without making the receiving node aware of changes to the delayed ACK protocol.

As discussed above, in other embodiments, the delayed ACK response time may be reduced by sending an odd number of data packets, or other packets including the data packets, to the receiving node to trigger the ACK response. In such embodiments, the sending node may send a dummy packet, duplicate packet, or split packets to reach an odd number of packets for triggering the ACK response by the receiving node. In further embodiments, the receiving node may be configured to send an ACK packet to the sending node if a certain expected number of packets, which may be an even or odd number, is received from the sending node. In this case, the sending node may send one or more additional dummy packets, duplicate packets, or split packets to reach the expected number of packets for triggering the ACK response by the receiving node. For example, the receiving node may be programmed to send the ACK packet after receiving three packets from the sending node. Accordingly, the sending node may send to the receiving node two dummy packets with a single data packet, or a single dummy packet with two data packets, to trigger the receiving node to send the ACK packet.

Figure 1:
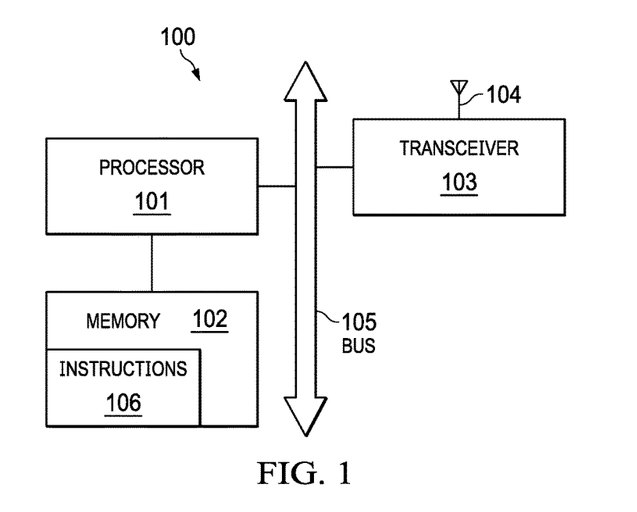
FIG. 1 is a block diagram of a hardware architecture for processing and exchanging data signals, in accordance with various examples.

FIG. 1 is a block diagram of a hardware architecture 100 of a processing and communication system useful for processing and exchanging data signals, in accordance with various examples. The processing and communication system may be a sending or receiving node capable of establishing a TCP connection to send and receive data or other packets in accordance with an ACK protocol. For example, the processing and communication system may be a computer, mobile or IoT device, or other device capable of establishing a connection with a network, such as the Internet, or with another device for exchanging data packets. The hardware architecture 100 includes hardware components that may be part of the processing and communication system. As shown in FIG. 1, the hardware architecture 100 may include one or more processors 101 and one or more memories 102. In some examples, the hardware architecture 100 may also include one or more transceivers 103 and one or more antennas 104 for establishing wireless connections. These components may be coupled through a bus 105, or in any other suitable manner. In FIG. 1, an example in which the components are coupled through a bus 105 is shown.

The processor 101 may be configured to read and execute computer-readable instructions. For example, the processor 101 may be configured to invoke and execute instructions stored in the memory 102, including the instructions 106. The processor 101 may support one or more global systems for wireless communication. Responsive to the processor 101 sending a message or data, the processor 101 drives or controls the transceiver 103 to perform the sending. The processor 101 also drives or controls the transceiver 103 to perform receiving, responsive to the processor 101 receiving a message or data. Therefore, the processor 101 may be considered as a control center for performing sending or receiving and the transceiver 103 is an executor for performing the sending and receiving operations.

In some examples, the memory 102 may be coupled to the processor 101 through the bus 105 or an input/output port (not shown). In other examples, the memory 102 may be integrated with the processor 101. The memory 102 is a non-transitory computer readable medium configured to store various software programs and/or multiple groups of instructions, including instructions 106. For example, the memory 102 may include a high-speed random-access memory and/or may include a nonvolatile memory such as one or more disk storage devices, a flash memory or another nonvolatile solid-state storage device. The memory 102 may store an operating system such as ANDROID, IOS, WINDOWS, or LINUX. The memory 102 may further store a network communications program. The network communications program is useful for communication with one or more attached devices, one or more user equipments, or one or more network devices, for example. The memory 102 may further store a user interface program. The user interface program may display content of an application through a graphical interface and receive a control operation performed by a user on the application via an input control such as a menu, a dialog box, or a physical input device (not shown). The memory 102 may be configured to store the instructions 106 for implementing the various methods and processes provided in accordance with the various examples of this description.

The antenna 104 may be configured to convert electromagnetic energy into an electromagnetic wave in free space or convert an electromagnetic wave in free space into electromagnetic energy in a transmission line. The transceiver 103 may be configured to transmit a signal that is provided by the processor 101 or may be configured to receive a wireless communications signal received by the antenna 104. In this example, the transceiver 103 may be considered a wireless transceiver.

The hardware architecture 100 may also include another communications component such as a Global Positioning System (GPS) module, cellular module, a BLUETOOTH or BLE module, ZigBee module, or a WI-FI module. The hardware architecture 100 may also support another wireless communications signal such as a satellite signal or a shortwave signal. The hardware architecture 100 may also be provided with a wired network interface or a local area network (LAN) interface to support wired communication.

In various examples, the hardware architecture 100 may further include an input/output device (not shown) such as an audio input/output device, a key input device, a display and the like. The input/output device may be configured to implement interaction between the hardware architecture 100 and a user/an external environment and may include the audio input/output device, the key input device, the display, and the like. The input/output device may further include a camera, a touchscreen, a sensor, and the like. The input/output device may communicate with the processor 101 through a user interface.

The hardware architecture 100 shown in FIG. 1 is an example of implementation in various examples of this description. During actual application, the hardware architecture 100 may include more or fewer components.

Figure 2:
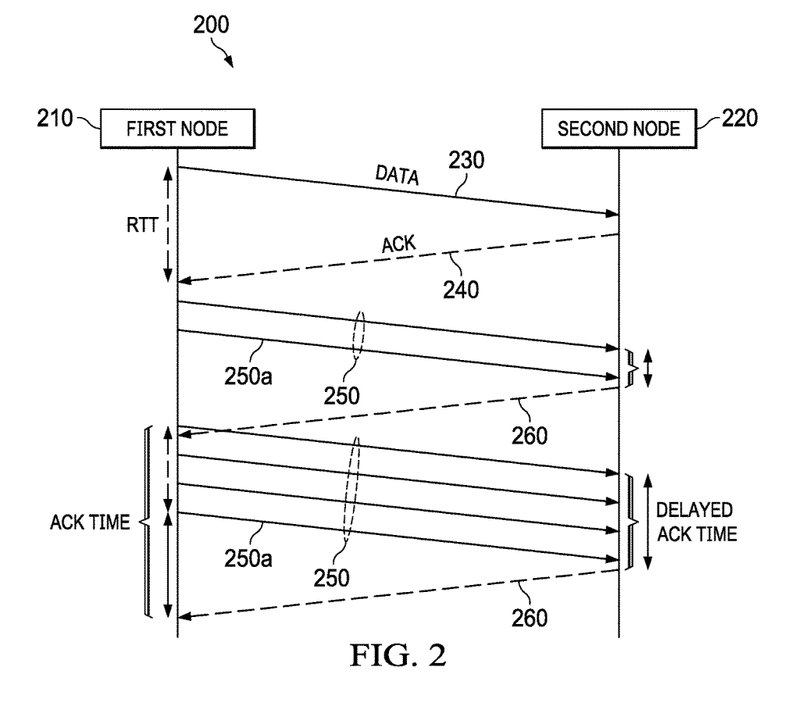
FIG. 2 is a message flow diagram of an ACK protocol, in accordance with various examples.

FIG. 2 is a message flow diagram of an ACK protocol 200, in accordance with various examples. The ACK protocol 200 may be implemented by a first node 210 and a second node 220 that exchange data packets 230 and ACK packets 240. The first and second nodes 210 and 220 may include respective transceivers 103 configured to send and receive data signals, including packets. The transceivers 103 of the first and second nodes 210 and 220 may communicate by exchanging the data packets 230, the ACK packets 240, and other packets. The first and second nodes 210 and 220 may be configured to communicate without a delayed ACK. For example, the first node 210 may send a single data packet 230 to the second node 220, and the second node 220 may return an ACK packet 240. The time of sending the data packet 230 and receiving the ACK packet 240 at the first node 210 is referred to as a round-trip time (RTT). The first and second nodes 210 and 220 may switch to a delayed ACK protocol, such as responsive to requirements for saving power. Accordingly, the first node 210 may send multiple data packets 250 in a transmission burst and receive in response a delayed ACK packet 260. For example, the first node 210 may send two first data packets 250 and receive a first delayed ACK packet 260 in a first transmission burst, and send four second data packets 250 and receive a second delayed ACK packet 260 in a second transmission burst.

The time for receiving the data packets 250 and sending the delayed ACK packet 260 at the second node 220 is referred to as the delayed ACK response time. In an embodiment, the delayed ACK response time may be reduced by sending an even number of data packets 250 to the second node 220. As discussed above, in other embodiments, the delayed ACK response time may be reduced by sending an odd number of data packets 250, or other number of packets including the data packets 250, to the second node 220 to trigger the ACK response. Returning to the embodiment in which an even number of data packets 250 are sent to reduce the delayed ACK response, if the number of data packets 250 sent from the first node 210 in a transmission burst is an odd number of data packets, the first node 210 may send an additional packet 250a to the receiving node. The additional packet 250a may be a dummy or data empty packet, or a duplicate packet of the last transmitted data packet 250. Transmitting a duplicate packet may cause a TCP slow start procedure which may cause some delay in transmission time between the communicating nodes. The delay may be tolerable for low throughput devices, such as IoT devices, that transmit data packets in transmission bursts between longer time transmission-free intervals. In other examples, rather than sending an additional packet 250a, the first node 210 may split a last data packet 250 into two packets to reach an even number of data packets 250. The content or data in the last data packet 250 may be spread into the two packets. Accordingly, the combined content or data of the two packets may provide the content or data of the split data packet 250. The size of each of the two packets may be smaller than the size of the split data packet 250. The MSS option in a TCP header of a data packet may be set to allow an even number of packets, including smaller sized split data packets, to trigger the ACK packet response. As shown in FIG. 2, reducing the delayed ACK response time at the second node 220 reduces the ACK response time at the first node 210. The combined RTT and the delayed ACK response time may be less than the retransmission time of the first node.

Figure 3:
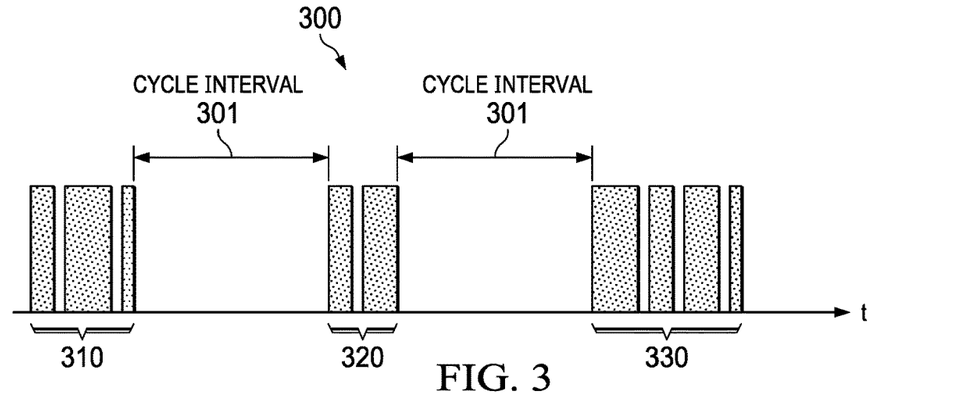
FIG. 3 is a block diagram of transmission bursts of packets between transmission free intervals, in accordance with various examples.

FIG. 3 is a block diagram of transmission bursts 300 of packets between transmission free intervals 301, in accordance with various examples. The transmission bursts 300 include a first transmission burst 310 of packets, a second transmission burst 320 of packets, and a third transmission burst 330 of packets. The first transmission burst 310 of packets, second transmission burst 320 of packets, and third transmission burst 330 of packets may include different numbers of data packets transmitted from a sending node before receiving an ACK packet from a receiving node. For example, the sending node may be the first node 210 and the receiving node may be the second node 220. In some examples, the transmission free intervals 301 may be repeated in periodic or quasi-periodic delay cycles over time. The sending node consumes power for sending and receiving the packets of the transmission bursts 300, and may enter a low power mode for saving power during the transmission free intervals 301. For example, the sending node may be an IoT device, a mobile device, or a communication device which may preserve power by entering a power saving mode. Power savings in such devices may be increased by shortening the time duration of the transmission bursts 300 of packets, such as by reducing the ACK response time.

Figure 4:
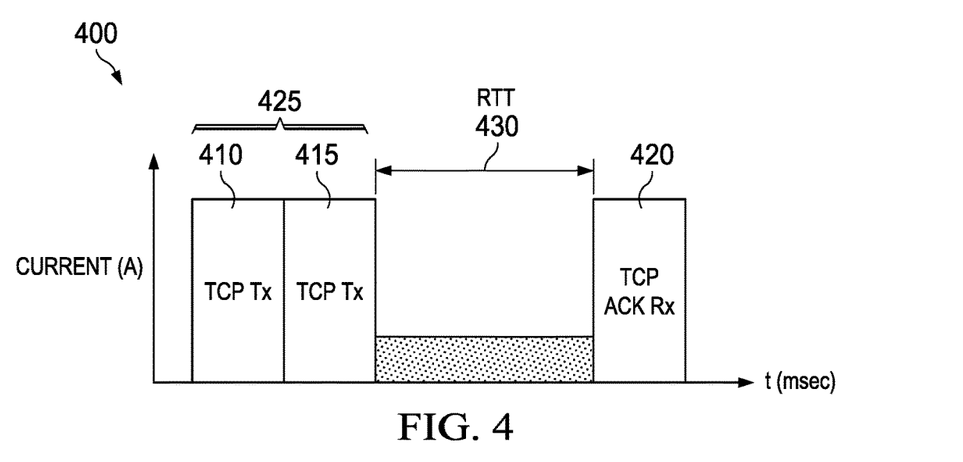
FIG. 4 is a block diagram of a transmission of TCP packets with an additional packet to reduce an ACK response time, in accordance with various examples.

FIG. 4 is a block diagram of a transmission 400 of TCP packets including an additional packet to reduce an ACK response time, in accordance with various examples. The transmission 400 is shown on a graph in which the x-axis represents a time period in millisecond (ms) of the transmission 400 of TCP packets, and the y-axis represents a current level in amperes (A) that is allocated for performing the transmission 400. The transmission 400 includes a first data packet 410 sent from a sending node followed by an additional packet 415 in a transmission burst of packets to a receiving node. The sending node may be the first node 210 and the receiving node may be the second node 220. For example, the additional packet 415 may be a dummy packet or a duplicate of the data packet 410 that is retransmitted. The reception of the ACK packet 420 at the sending node may require a lower current level than the transmission of the data packet 410 or the additional packet 415. The even number of packets in the transmission burst 425 triggers the receiving node to respond with an ACK packet 420 after an RTT 430 from the last sent packet (e.g., the additional packet 415). The receiving node may respond with the ACK packet to the sending node immediately or without delay after receiving the even number of packets. Triggering the receiving node to transmit the ACK packet 420 may reduce the delayed ACK wait time. Accordingly, the total ACK response time during the transmission 400 may be approximately equal to the RTT 430.

Figure 5:
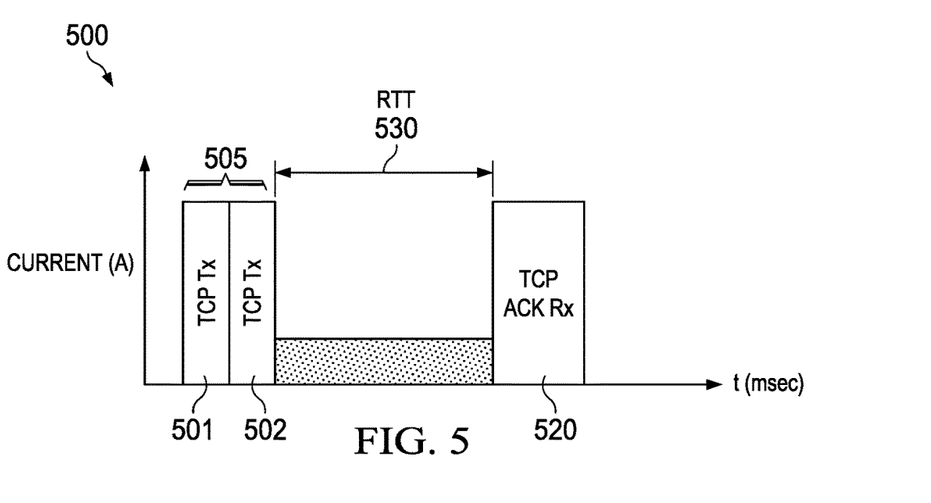
FIG. 5 is a block diagram of a transmission of TCP packets by splitting a data packet to reduce an ACK response time, in accordance with various examples.

FIG. 5 is a block diagram of a transmission 500 of TCP packets by splitting a data packet to reduce an ACK response time, in accordance with various examples. The transmission 500 is shown on a graph in which the x-axis represents a time period in ms of the transmission 500 of TCP packets, and the y-axis represents a current level in amperes for performing the transmission 500. In the transmission 500, the data packet to be transmitted (not shown) is split into a first data portion packet 501 and a second data portion packet 502 sent from a sending node in a transmission burst 505 of packets to a receiving node. For example, the sending node may be the first node 210 and the receiving node may be the second node 220. The first data portion packet 501 and second data portion packet 502 may be provided by splitting a single larger data packet into two packets before transmission. The first data portion packet 501 and second data portion packet 502 may have a combined transmission time approximately equal to the transmission time of a single data packet. The first data portion packet 501, second data portion packet 502, and ACK packet 520 may have approximately the same current level. By splitting a single data packet into two data portion packets (e.g., first data portion packet 501 and second data portion packet 502), an even number of packets is transmitted for triggering the receiving node to respond with an ACK packet 520 after an RTT 530 from the last sent packet (second data portion packet 502).

The amount of power saved at the sending node, which triggers the receiving node to send the ACK packet, can be evaluated by considering the time delays for sending the packets and the amount of current for transmitting the packets. For example, a delayed ACK response time may range between approximately 50 ms to approximately 200 or 500 ms. A transmission delay for sending a TCP dummy packet may be approximately 0.2 msec. The amount of current for transmitting the TCP dummy packet may be approximately 250 milliamperes (mA), while the amount of current for powering a node circuit in a standby mode for an idle transmission state may be approximately 10 mA. According to such values, an amount of electric charge for sending a TCP dummy packet to reduce the delayed ACK response time may be approximately 250 mA×0.2 ms, and the amount of electric charge for maintaining the node in the standby mode may range approximately between 50 ms×10 mA to 200 ms×10 mA. Accordingly, the amount of electric charge saved by sending the TCP dummy packets in the delayed ACP protocol may range from about 10× to 40× in magnitude. This example may be applicable for single TCP packet transmissions during transmission bursts of packets, such as in single "keep alive" packet transmission periods. The single "keep alive" packets may be sent periodically to maintain the connectivity between the communicating nodes at the application level. The sending node may send a single "keep alive" packet at the application level and wait for a "keep alive" response from the receiver node. If the receiver node supports the delayed ACK protocol, the sending node may send a second packet after the single "keep alive" packet to trigger the "keep alive" packet ACK response without waiting for timing out after receiving the "keep alive" packet from the sending node. The example above may also be considered for overall transmission bursts, where the percentage of transmitting an odd number of packets versus an even number of packets may be at about 50 percent of total transmissions.

Figure 6:
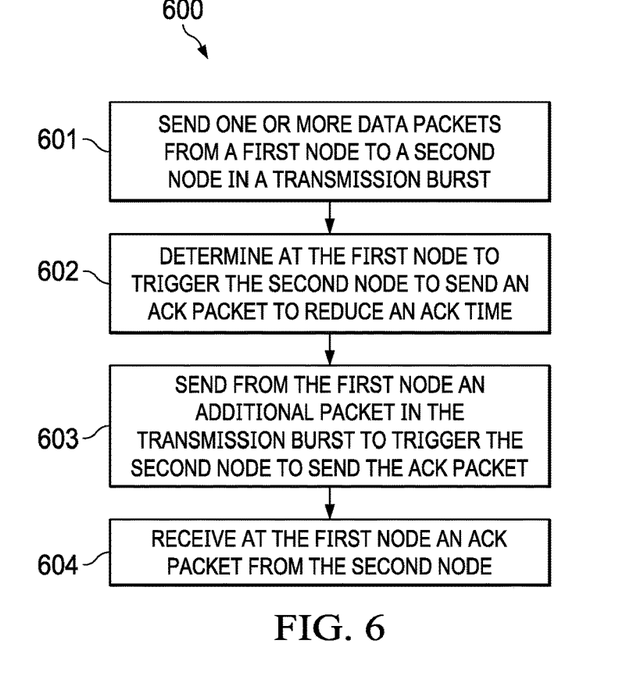
FIG. 6 is a flow diagram of a method for an ACK protocol to reduce an ACK response time, in accordance with various examples.

FIG. 6 is a flow diagram of a method 600 for an ACK protocol to reduce an ACK response time, in accordance with various examples. The method 600 may be performed by a sending node that exchanges TCP packets with a receiving node according to an ACK protocol. For example, the sending and receiving nodes may be the first and second nodes 210 and 220 and may include a processing and communication system with the hardware architecture 100 configured to implement the method 600. At step 601, the first node 210 may send one or more data packets to the second node 220 in a transmission burst. The number of data packets may be an odd number of packets. For example, the first node 210 may be an IoT device that sends one or three data packets in a transmission burst to a mobile device or a control device.

At step 602, the first node 210 may determine to trigger the second node 220 to send an ACK packet to reduce an ACK response time. The determination may be based on the odd number of packets sent, the estimated or expected delayed ACK response time at the second node 220, power requirements or criteria of the first node 210, or any combination thereof. For example, the first node 210 may implement a pacing process in which a programmed wait time to receive the ACK packet is monitored at the first node 210. The wait time may be started after sending a last data packet to the second node 220. At the end of the programmed wait time, the first node 210 may trigger the second node 220 to send the ACK packet. In other examples, the first node 210 may keep count of the number of sent data packets in a transmission burst to the second node 220. If the number of sent data packets reaches a preset or expected number of packets, the first node 210 may trigger the second node 220 to send the ACK packet. The number of expected data packets to send may be determined according to communication and network parameters or criteria or according to transmission history. In some examples, the first node 210 may determine to trigger the second node 220 to send the ACK packet based on a number of data packets expected at the second node 220 during a transmission burst, or based on both the number of sent data packets and the number of expected data packets at the second node 220 during the transmission burst.

At step, 603, the first node 210 may send an additional packet in the transmission burst to trigger the second node 220 to send the ACK packet. The additional packet causes the number of packets in the transmission burst to reach an even number of packets, e.g., sized according to a MSS option, which may trigger the second node 220 to respond with the ACK packet. The additional packet may be a dummy or data free packet, a retransmission of a last data packet, or a second data portion packet to a preceding first data portion packet. The first and second data portion packets may be part of a single data packet that was initially designated to carry data to the second node 220. The even number of packets may include full sized packets set by the MSS option and a retransmitted packet or a data free packet. At step 604, the first node 210 may receive an ACK packet from the second node 220. The ACK packet may end the transmission burst and allow the first node 210 to enter a power saving mode, during a transmission free interval.

Figure 7:
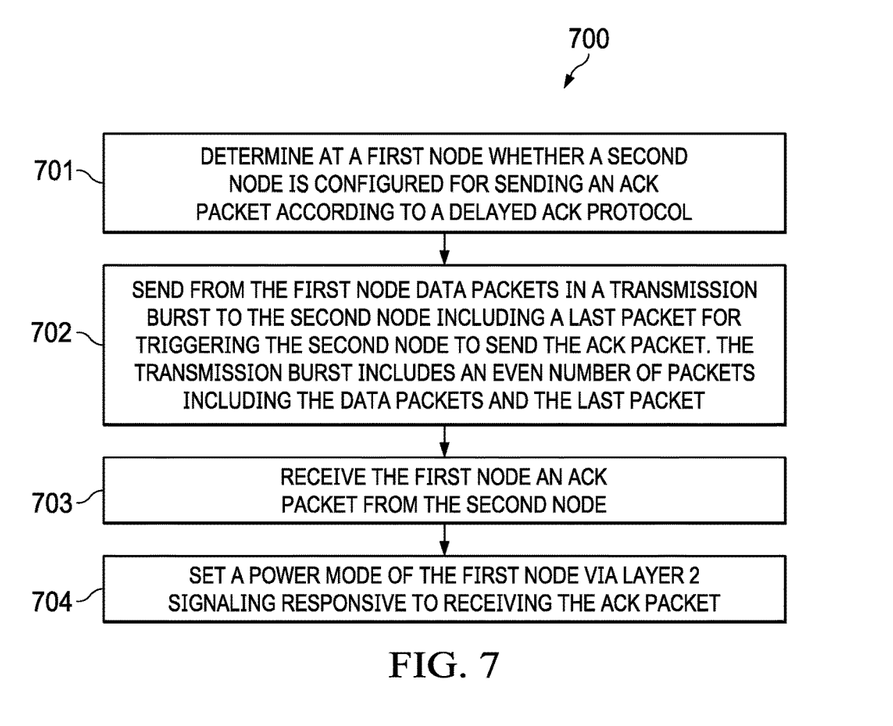
FIG. 7 is a flow diagram of a method for an ACK protocol to reduce an ACK response time, in accordance with various examples.

FIG. 7 is a flow diagram of a method 700 for an ACK protocol to reduce an ACK response time, in accordance with various examples. The method 700 may be performed by a sending node that exchanges TCP packets with a receiving node according to a delayed ACK protocol. For example, the sending and receiving nodes may be the first and second nodes 210 and 220 and may include a processing and communication system with the hardware architecture 100 configured to implement the method 700. At step 701, the first node 210 may determine whether the second node 220 is configured for sending an ACK packet according to the delayed ACK protocol. For example, the first node 210 may receive, from the second node 220 or another network device, information indicating support of the second node 220 for the delayed ACK protocol.

At step 702, the first node 210 may send data packets in a transmission burst to the second node 220, including a last packet for triggering the second node 220 to send the ACK packet. The transmission burst from the first node 210 may include an even number of packets including the data packets and the last packet. At step 703, the first node 210 may receive an ACK packet from the second node 220. At step 704, responsive to receiving the ACK packet, the first node 210 may set a power mode of the first node 210 via Layer 2 signaling or any other suitable process. The power mode may cause the first node 210 to switch to a low power mode, such as a sleep mode or a deep sleep mode. Accordingly, the ACK packet may end the transmission burst and allow the first node 210 to enter a power saving mode during a transmission free interval.

The steps of the method 600 or 700 performed by the first node 210 may be transparent to the second node 220. For example, the method 600 or 700 may be performed by the first node 210 without making the second node 220 aware of the ACK response triggering mechanism. The second node 220 may continue to implement the delayed ACK protocol without a modification to the protocol at the second node 220. To trigger the second node 220 to send the ACK packet without waiting for timing out after receiving an odd number of packets in a transmission burst, the first node 210 may be configured to detect whether the second node 220 is configured for the delayed ACK protocol. If the first node 210 determines that the second node 220 is not configured for the delayed ACK protocol, the first node 210 may not send additional packets for triggering the second node 220 to send the ACK packet to the first node 210. The first node 210 may be configured in a static or adaptive manner to trigger the ACK packet, such as according to power optimization criteria. The configuration may be part of the TCP or provided in a media access control (MAC) communication layer. The MAC communication layer is also referred to as Layer 2 (L2). For example, the method 600 may be performed by the first node 210 responsive to static power optimization selection strategies or in an adaptive manner for optimizing power consumption responsive to updated network parameters. The second node 220 may also be configured to monitor or estimate the delayed ACK response time to determine whether to trigger the ACK packet by the second node 220. The determination may also be based on the number of packets sent to the second node 220 during the same transmission burst. The first node 210 may also be configured to perform signaling at the MAC communication layer (or L2 layer) to select a power mode according to power requirements. This may include setting the RTT for transmission bursts of packets.

The term "couple" appears throughout the specification. The term may cover connections, communications or signal paths that enable a functional relationship consistent with this description. For example, if device A provides a signal to control device B to perform an action, in a first example device A is coupled to device B or in a second example device A is coupled to device B through intervening component C if intervening component C does not substantially alter the functional relationship between device A and device B such that device B is controlled by device A via the control signal provided by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device or a combination thereof.

An architecture or device that is described herein as including certain components may instead be adapted to be coupled to those components to form the described architecture or device.

Unless otherwise stated, "about," "approximately," or "substantially" preceding a value means +/−10 percent of the stated value. Modifications are possible in the described examples, and other examples are possible within the scope of the claims.

What is claimed is:

1. A method, comprising:
sending a data packet in a transmission burst of packets from a first transceiver to a second transceiver, the data packet configured according to a transmission control protocol (TCP), the second transceiver operating according to a delayed acknowledgement (ACK) protocol;
determining a first condition that causes the second transceiver to delay sending an ACK packet in accordance with the delayed ACK protocol, wherein determining the first condition comprises determining that the transmission burst of packets comprises an odd number of packets, or an even number of packets;
in response to determining the first condition, triggering the second transceiver to send the ACK packet according to the delayed ACK protocol by sending, from the first transceiver to the second transceiver, an additional packet; and
receiving, at the first transceiver, the ACK packet from the second transceiver responsive to the additional packet.

2. The method of claim 1, wherein the additional packet is sent before the data packet.

3. A method, comprising:
sending a data packet in a transmission burst of packets from a first transceiver to a second transceiver, the data packet configured according to a transmission control protocol (TCP), the second transceiver operating according to a delayed acknowledgement (ACK) protocol;
determining a first condition that causes the second transceiver to delay sending an ACK packet in accordance with the delayed ACK protocol;
in response to determining the first condition, triggering the second transceiver to send the ACK packet according to the delayed ACK protocol by sending, from the first transceiver to the second transceiver, an additional packet; and
receiving, at the first transceiver, the ACK packet from the second transceiver responsive to the additional packet, wherein the ACK packet is received after sending an even number of packets sized according to a maximum segment size (MSS) option including the data packet and the additional packet in the transmission burst of packets to the second transceiver.

4. The method of claim 1, wherein the additional packet is a data free packet.

5. The method of claim 1, wherein the additional packet is a duplicate of the data packet.

6. The method of claim 1, wherein the data packet and the additional packet are first and second data portion packets of a larger packet, and wherein the larger packet is split into the data packet and the additional packet.

7. The method of claim 1, further comprising determining whether to trigger the second transceiver to send the ACK packet based on an ACK response time.

8. The method of claim 1, further comprising determining whether to trigger the second transceiver to send the ACK packet is based on a time duration of the transmission burst of packets sent from the first transceiver to the second transceiver including the data packet.

9. The method of claim 8, wherein the time duration of the transmission burst is shorter than transmission free intervals of the first transceiver.

10. The method of claim 1, further comprising determining whether to trigger the second transceiver to send the ACK packet based on power criteria of the first transceiver.

11. A method, comprising:
sending, by a first transceiver, data packets to a second transceiver in a transmission burst;
determining, by the first transceiver, whether the second transceiver is configured for sending an acknowledgement (ACK) packet according to a delayed ACK protocol;
determining whether the transmission burst comprises an odd number of packets;
in response to determining that the second transceiver is configured according to the delayed ACK protocol, and in response to determining that the transmission burst comprises an odd number of packets, sending, by the first transceiver, a last packet for triggering the second transceiver to send the ACK packet, wherein the transmission burst includes an even number of packets including the data packets and the last packet; and
in response to determining that the second transceiver is not configured according to the delayed ACK protocol, not sending the last packet.

12. The method of claim 11, wherein the last packet is a duplicate packet of one of the data packets.

13. The method of claim 11, wherein the last packet is a transmission control protocol (TCP) dummy packet.

14. The method of claim 11, wherein the last packet is smaller in size than other packets of the data packets.

15. The method of claim 11, further comprising:
receiving the ACK packet from the second transceiver; and
responsive to receiving the ACK packet, setting a power mode of the first transceiver via Layer 2 signaling.

16. The method of claim 11, wherein the ACK packet is received after a round-trip time (RTT) without waiting for a delayed ACK response time.

17. An apparatus comprising:
a memory configured to store instructions; and
a processor coupled to the memory, wherein the instructions cause the processor to be configured to:
send a data packet in a transmission burst of packets to a transceiver, wherein the data packet is configured according to a transmission control protocol (TCP);
determine a first condition that causes the transceiver to delay sending an ACK packet in accordance with a delayed ACK protocol, wherein determining the first condition comprises determining that the transmission burst of packets comprises an odd number of packets, or an even number of packets;
in response to determining the first condition, triggering r the transceiver to send the ACK packet according to the delayed ACK protocol by sending a dummy packet or a duplicate of the data packet in the transmission burst of packets; and
receive the ACK packet from the transceiver before a timing out of the transceiver according to the delayed ACK protocol.

18. The apparatus of claim 17, wherein the apparatus is a battery powered Internet of things (IoT) device.

19. The apparatus of claim 17, wherein the ACK packet is received responsive to sending the duplicate of the data packet in the transmission burst of packets.

20. The method of claim 1, wherein the data packet is sent in a transmission burst of packets from the first transceiver to the second transceiver, and wherein the additional packet is sent after the data packet.

21. The method of claim 1, wherein determining the first condition comprises determining that the transmission burst of packets comprises an odd number of packets.

22. The method of claim 1, wherein determining the first condition comprises determining that the transmission burst of packets comprises an even number of packets.

23. The method of claim 15, further comprising entering, according to the power mode, a low power mode of the first transceiver responsive to receiving the ACK packet from the second transceiver.

* * * * *